Figure 1:
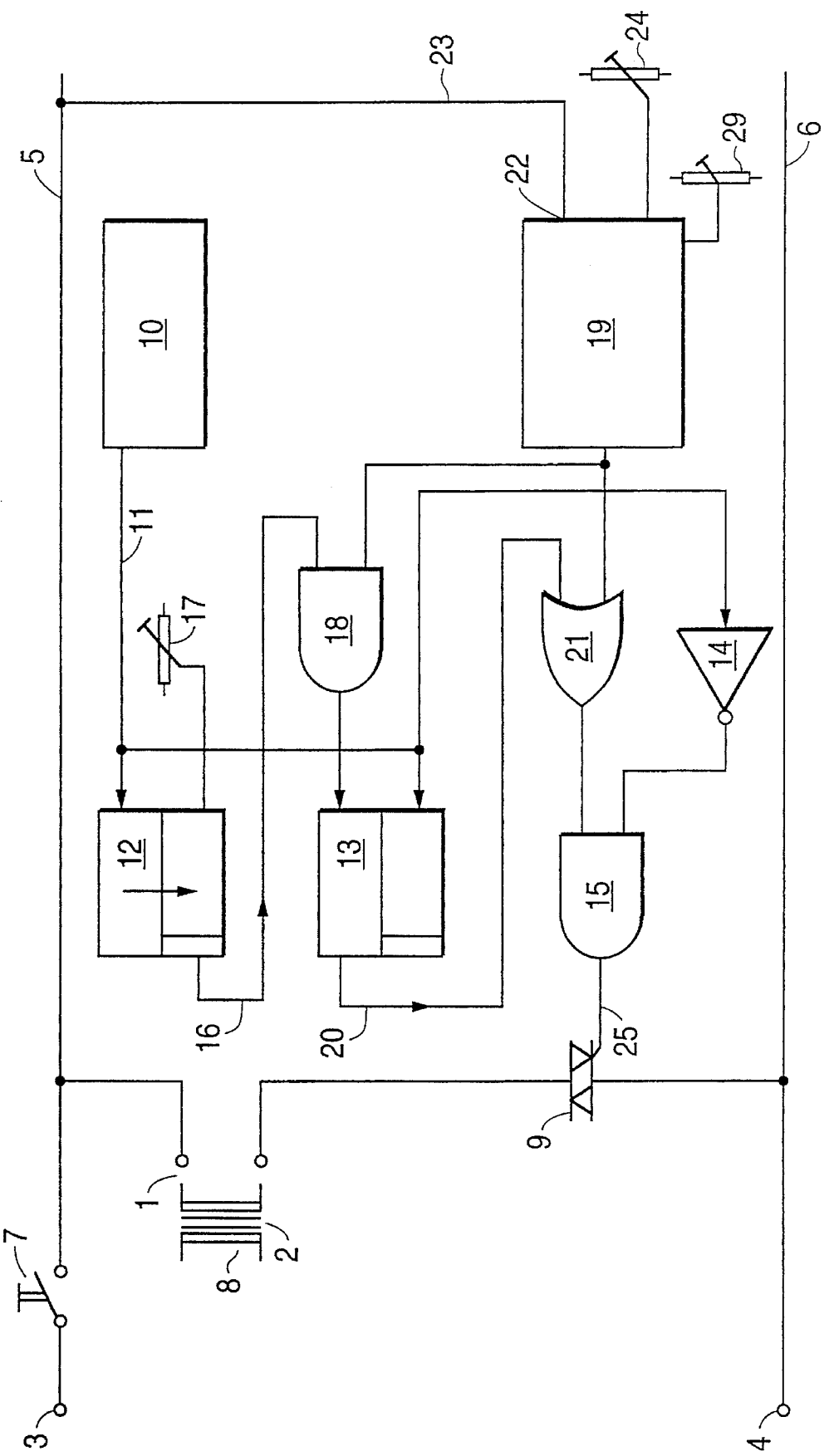

United States Patent [19]

Konstanzer

[11] Patent Number: 5,517,380
[45] Date of Patent: May 14, 1996

[54] METHOD AND APPARATUS FOR AVOIDING POWER-UP CURRENT SURGE

[75] Inventor: Michael Konstanzer, Freiburg, Germany

[73] Assignee: Fraunhofer Gesellschaft Zur Forderung der Angewandten, Munich, Germany

[21] Appl. No.: 396,075

[22] Filed: Feb. 28, 1995

Related U.S. Application Data

[63] Continuation of Ser. No. 69,341, May 28, 1993, abandoned.

[30] Foreign Application Priority Data

May 29, 1992 [DE] Germany .................. 42 17 866.5

[51] Int. Cl.$^6$ .................................................. H03K 17/22
[52] U.S. Cl. .................. 361/93; 361/35; 361/20; 361/18
[58] Field of Search .................. 361/93, 91, 98, 361/18, 20, 25, 21, 35; 323/238, 321, 908; 307/239

[56] References Cited

U.S. PATENT DOCUMENTS 4,879,477  11/1989  Kruger ........................ 307/239

Primary Examiner—A. D. Pellinen
Assistant Examiner—S. Jackson
Attorney, Agent, or Firm—Antonelli, Terry, Stout & Kraus

[57] ABSTRACT

A method and apparatus for avoidance of power-up current surge upon activation of a current supply device under inductive effect. An alternating-current switch is connected in series with the current supply device and a phase cut-in circuit is provided for enabling adjustable connection of the current supply device with the mains alternating voltage starting with the instant of powering up with equal-size unipolar phase segments. A switching unit is provided for activation of the phase cut-in circuit so that a predetermined number of the equal-size unipolar segments can be produced. An oppositely poled half wave which follows in time immediately is switched with an ignition signal of 170 to 180 degrees. In the phase cut-in circuit, respectively, an ignition signal is produced at the predetermined phase cut-in angle in the half waves following this half wave. Accordingly, independently of the remanence of the current supply device, as determined by a preceding deactivation, it is safely ensured in a simple manner with a small number of electronic components, for example, that a brightening of dimmed low-voltage illuminating systems is effected or that a welding transformer is switched on without the occurrence of a power-up peak current.

12 Claims, 2 Drawing Sheets

METHOD AND APPARATUS FOR AVOIDING POWER-UP CURRENT SURGE

This application is a continuing application of Ser. No. 08/069,341, filed May 28, 1993, now abandoned.

The invention relates to a method for the avoidance of power-up current surge during the starting up of a current supply device under inductive load connected in series with an alternating-current switch, wherein with a phase cut-in circuit the duration of the connection of the current supply device under inductive effect with the mains alternating voltage established with unipolar voltage segments can be adjusted beginning with the instant of starting up (German Patent 4,019,592), as well as to an apparatus for performing the method.

In previous power-up methods, inrush peak currents, stressing or even destroying the switching circuits, occur which are unbalanced in their polarity. German Patent 4,019,592 solves these problems by powering up with unipolar voltage segments having constantly increasing voltage segments. In this process, the transformer response is continuously measured by detecting the reactive current pulses. Upon the occurrence of a thus-detected small power-up peak reactive current, the transformer is fully turned on in phase opposition.

This apparatus has the drawback that a scanning circuit comprising many elements must be provided, rendering this apparatus expensive in large-scale production use.

Starting with this state of the art, the invention is based on the object of providing a method and an apparatus of the type discussed above making it possible to supply a current supply device under inductive load with cut-in mains half waves and to ensure, in a simpler and less expensive way, that an inrush peak current which destroys a fuse and endangers the circuit is safely avoided.

This object has been attained according to this invention for a method by switching on the current supply device under inductive load with a succession of substantially equal-size unipolar voltage segments wherein, after a predetermined fixed number of switching-on steps, starting up is effected in the subsequent opposite phase with the equally large unipolar segments.

By the use of unipolar cut-in half waves succeeding one another at the periodic interval, the angular value of which is constant, the current supply unit under inductive load is brought, independently of the original activation phase position and remanence condition in the transformer, gradually into a defined remanence condition expected by the circuit. The number of cut-ins is selected to be so large that, with positively poled voltage segments, a negative remanence can safely be shifted into a positive remanence. A corresponding polarity reversal is to be provided when selecting negative voltage segments.

Accordingly, there occur small reactive currents not endangering the circuit after a number of cut-in-half waves depending on the type of structure and remanence condition of the current supply device. In case the remanence exhibits reverse polarity, these reactive currents either do not occur in any of the segments or they occur only in it the last segment or segments whereas a remanence exhibiting the same poling leads already to an occurrence of reactive currents over almost the entire setting period.

In this connection, it is avoided to detect the reactive current occurring during magnetization as a sign of beginning saturation.

However, it has now become possible by the method of this invention to employ a very simple circuit that is sophisticated in its simplicity. This is so because the aforementioned problem has been solved, for an apparatus suitable for accomplishing the method for avoiding a power-up current surge upon turning on a current supply device under inductive load connected in series with an alternating-current switch, by the feature that a phase cut-in circuit is provided, by means of which the connection of the current supply device under inductive effect with the mains alternating voltage is adjustable, by way of the alternating-current switch starting with the starting-up instant, with unipolar phase segments, wherein, by means of the phase cut-in circuit, only ignition signals with substantially equally large unipolar segments can be produced for establishing the aforesaid connection, and by the feature that a switching means is provided which can turn on the current supply device under inductive load after a predetermined number of switching-on steps with the equally large unipolar angles in the opposite phase.

The number of segments and the size of the unipolar cut-in angle to be used is dependent in each case on the current supply device under inductive load. The larger the voltage segment, the less segments are required for imparting, to a transformer beginning with inverted remanence, the remanence suitable for connection. Use of a larger segment, however, leads also to higher reactive currents upon attaining remanence so that a compromise must be chosen between the two variables.

The elimination of a circuit for detecting an excess current makes it possible to use a different and very simple circuit, especially as compared with German Patent 4,019,592 which leads, especially in large-scale manufacture, to savings in structural parts and labor. These savings have been made possible because in series production the type of current supply device under inductive load that is to be connected is known and therefore the aforementioned variables, namely angle and number of segments, can be safely fixedly predetermined.

Additional advantageous embodiments of the invention are characterized in the dependent claims.

Figure 2:
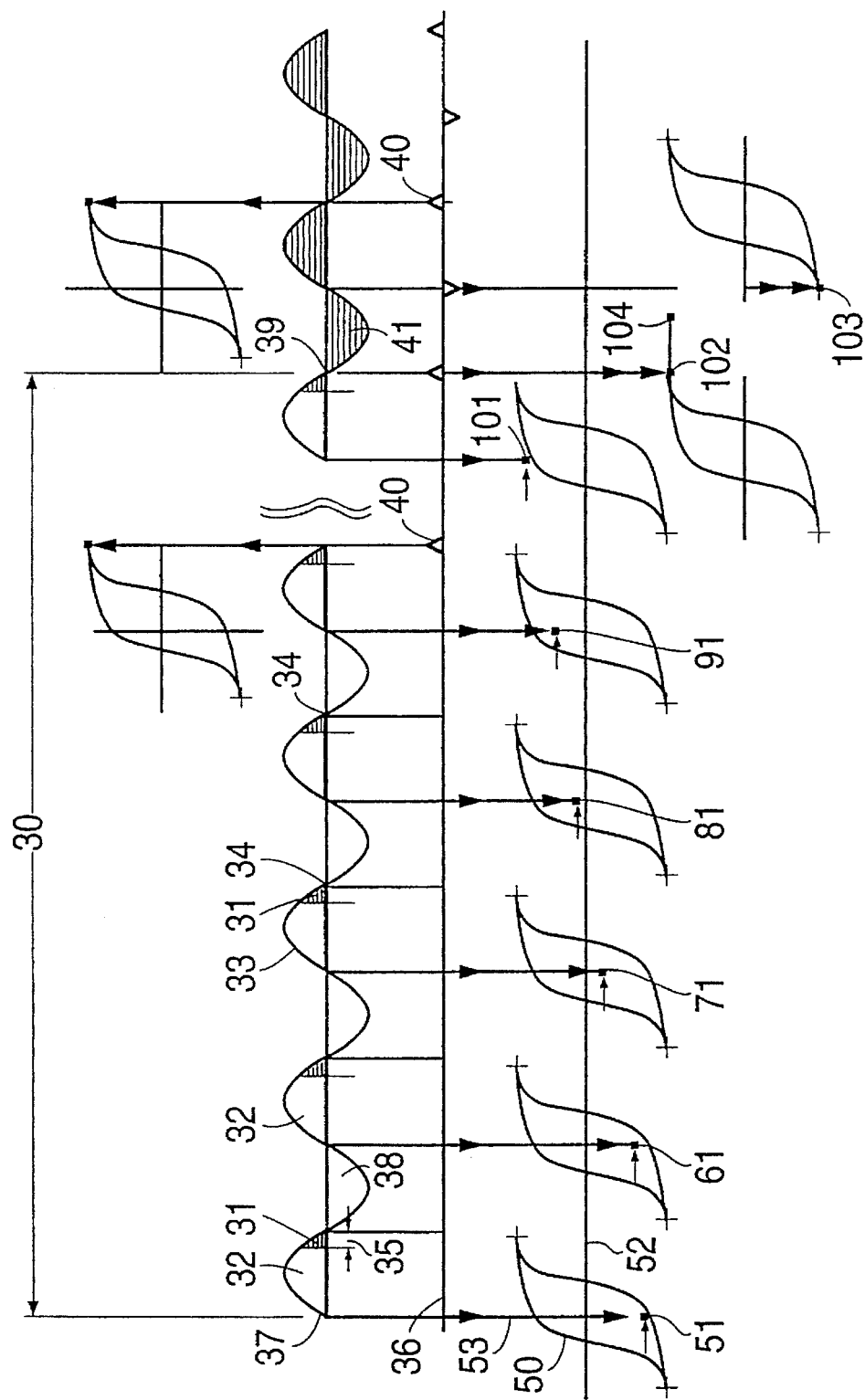

One embodiment of the invention will be described in greater detail below by way of example with reference to the drawings wherein:

FIG. 1 is a block circuit diagram of an apparatus for limiting power-up current peaks on the primary side of a transformer in accordance with one embodiment of the invention, and FIG. 2 depicts signal curves of the mains voltage, as well as of the mains current upon switching on of the transformer with an apparatus according to FIG. 1.

FIG. 1 shows a block circuit diagram of an apparatus for limiting power-up current peaks on the primary side 1 of a transformer 2 according to one embodiment of the invention. The transformer 2 represents a possible current supply device under inductive effect which can also be constituted, for example, by an inductive load.

The mains voltage applied to contacts 3, 4 feeds an advantageously nonferrous mains section providing the positive operating voltage, not illustrated in FIG. 1, for the circuit shown in FIG. 1. The plug-in contact 4 is connected with circuit mass 6 whereas the other plug-in contact 3 leads, on the one hand, via a mains switch 7 to the mains voltage 5 and, on the other hand, to the primary winding 1 of the transformer 2; the latter can be connected to a load 8 on the secondary side.

The second primary-side plug-in contact of the transformer 2 is connected via an alternating-current switch 9 in the form of a triac, which can also be substituted by two thyristors, to circuit mass 6.

A voltage supply identification unit 10 produces a rapid and dynamic mains-on identification signal once the mains switch 7 is closed. This signal is conducted by way of a control line 11 and takes care, in a manner to be described below, especially of having the alternating-current switch 9 turned on only when all circuit components exhibit a secured current supply.

On the one hand, this signal is fed to the reset input of a timing member 12, for example in the shape of a mono-flop, and resets the latter. Furthermore, this signal resets a flip-flop 13 and prevents a possible switching step, and finally an AND gate 15 is connected by way of an inverter 14 so that during the first voltage applied, for example, for 20 milliseconds, the AND gate 15, as an enabling and disabling gate, effectively prevents switching on of the alternating-current switch 9.

During this start-up period of the circuit, the timing member 12 switches its inverting output 16 to a level-zero signal and maintains the latter. This signal exists for a time period 30 illustrated in FIG. 2, settable with the aid of a setting potentiometer 17. Beside the illustrated use of a mono-flop 12, it is also possible to employ any simple RC combination exhibiting a chronological voltage curve permitting a falling below and an exceeding of a switching threshold.

The level-zero signal applied for the predetermined time period 30 is connected in an AND gate 18 with the output signal of a cut-in control circuit 19. The switching member 13 connected to this AND gate 18, however, can switch over only after elapse of the above-mentioned time period 30.

Up to then, the signal generated by the cut-in control circuit 19 is applied to an OR gate 21 connected to the output 20 of the flip-flop 13, this OR gate then being connected via the aforementioned switch-in protection gate 15, with the ignition input of the alternating-current switch 9.

The cut-in control circuit 19 can be realized, for example, by the integrated switching circuit TCA 785 by the Siemens company. The synchronizing input 22 of the cut-in control circuit 19 is connected via a line 23 to the mains operating voltage 5.

A level-one signal for a constant unipolar segment 31 can be produced with the cut-in control circuit 19, this segment being shown in FIG. 2. The positive segment 31 illustrated here can, of course, also be inverted in other embodiments of the invention, in which case then the other components must be correspondingly adapted. Preferably, an RC switching circuit, not illustrated in the figures, is provided made up, in particular, of a parallel circuit consisting of a resistor and a capacitor and simulating a mains voltage leading by several angular degrees at the synchronizing input 22 of the cut-in control circuit 19, so that the thyristor enable time at the end of each mains half wave is compensated for and thus the ignition signal terminates somewhat before the actual mains half wave.

In the cut-in control circuit 19, a ramp generator is provided, for example. The maximum voltage and the slope characteristic of the signal ramps, present for example in sawtooth shape, can be adjusted with the ramp resistance potentiometer 24, producing a pulse in each case when the ramp is passed in the upward or downward direction.

A pulse is herein generated in each case only in unipolar fashion, the pulse duration being defined in such a way that the pulse length is always extended up to the zero passage of the presently applied half wave 32. Since the triac 9 is ignited with the switching pulses on line 25, and a pulse on line 25 still present in the zero passage of the mains alternating voltage 33 must be prevented from igniting the triac 9, the RC switching circuit simulating a leading mains voltage 33 is located in front of the synchronizing input 22 of the cut-in control circuit 19. Consequently, the pulse applied to line 25 safely ends several degrees before each zero passage 34 of the mains alternating voltage 33.

Thus, after elapse of the starting time predetermined by the voltage supply identification unit 10, unipolar ignition signals to a specific angle 35 generated by the cut-in control circuit 19 are applied to the alternating-current switch 9 for the duration of the time predetermined by the timing member 12 whereby the transformer 2 is connected to the mains in each second half wave for the time predetermined by the angle 35.

The mode of operation of this cut-in procedure can be explained in simpler fashion in connection with FIG. 2.

FIG. 2 shows curves of the mains voltage 33 and of the primary-side current 36 upon switching on of the transformer 2.

The sinusoidal curve 33 shows the mains alternating voltage which is turned off at an arbitrary point in time which latter need not be congruent, in particular, with the end of a half wave, either. In FIG. 2, the shading between abscissa and curve 33 means that the mains voltage is detected by the voltage mains device and thus is applied to the primary-side winding of the transformer 2.

After the incidental instant of turning off the mains voltage 33, the transformer 2 is switched on before the end of the positive half wave 32 of the mains voltage 33 beginning at an instant 37.

The hysteresis curve 50 of the transformer 2, i.e. the induction-field strength diagram, exhibits upon starting-up a point 51 indicating the remanence due to the switching-off step. In the instance shown in FIG. 2, the transformer 2 has a negative remanence 51. The cut-in control circuit 19 connects, in the positive half wave 32, the voltage segment 35 to the transformer 2. The voltage segment 35 is located prior to the transition of the positive half wave 32 into the negative half wave 38. Thereby the field strength 52 is increased into the positive range, the induction 53 simultaneously being changed in the direction of more positive values. After termination of the half wave 32 and thus the end of the connection of the voltage segment 35, the magnetizing condition in the iron of the transformer returns to a remanence 61 exhibiting an induction 53 which is somewhat higher and shifted in the positive direction. This process is not accompanied by the occurrence of a reactive current 36.

The above-described process is repeated in the subsequent positive half waves 32 so that, after traversing the above-mentioned curve wherein the field strength 52 rises together with the induction density 53, the remanence 71, 81 and 92 will in each case be somewhat more positive than before. After, in this case, or example five full waves, the remanence 91 has almost reached the operating magnetization curve 50. With each subsequent segment 35, the remanence then follows the hysteresis curve 50, then being, starting with the remanence 101, in the maximum operating induction 102 in each case upon termination of the segment 35, i.e. the zero passage 39, i.e. a saturation field strength 104 has been attained corresponding to the maximum operating current induction. In this process, a reactive current 40 then occurs each time which does not endanger the circuit and the consumer because it corresponds to the no-load current of an inductive load.

After the time period 30 has elapsed, the timing member 12 is reset during the occurrence of a segment 35 and the flip-flop 13 becomes conductive so that, upon passage through zero 39 and all subsequent zero passages, an ignition signal is applied to the alternating-current switch 9; consequently, the consumer, with reference to the last positive half wave 32 is fully connected in the following opposite phase 41. During this process, the magnetization condition of the iron in transformer 2 then passes through the hysteresis curve up to the negative operating induction 103 and back again.

After each voltage time area application to the transformer 2, the remanence 51 increases somewhat toward more positive values until is moves via the intermediate points 61, 71, 81, 91 and 101 into the positive maximum operating induction 102. During this step, the remanence 51 etc. increases by an increase in field strength which recedes again, in the manner of a magnetic spring, in the resting time up to the subsequent segment 35 and, because it starts from a higher induction 53, also passes on to a higher remanence 61, etc. The resting time of, for example, 15 milliseconds remaining at an alternating voltage of 50 Hertz is more than adequate for the magnetization to migrate back into the remanence point on the axis 52. The aforementioned switch-on time of 5 milliseconds corresponds to a cut-in angle of 90 degrees.

The respective segment 35 preferably has a predetermined size, producing in each case, with the given current supply device 2 under inductive effect, a field strength 52 smaller or at most equal to the saturation field strength 104. Thus, the reactive currents are restricted to the magnitude 40 occurring upon attaining saturation. The segment 35 here advantageous lies between 10 and 90 degrees. On account of this selection with an interposed resting period, the magnetization can snap back in the manner of a spring, and there occurs no integration of the unipolar voltage segments and thus no magnetizing field strength.

The number of half waves 32, i.e. the number of switch-on steps, is selected to be so large that, at the segment 35 of predetermined size, it is possible to safely convert a remanence 51 of the inductivity-burdened current supply device 2, inverted with respect to the poling of segment 35, i.e. the most unfavorable case, illustrated in FIG. 2, into the magnetization of the same poling. This means that, with the given segment 35 setting the maximum reactive current 40, the number of segments 35 is advantageously preset until, in one or several half waves 32, reactive currents 40 occur up to the end of the time interval 30. This is to be determined in each case for a transformer 2 during series manufacture and can then be preset in the entire series.

By presetting a larger segment 35, a higher reactive current 40 can here be tolerated; the segment 35 in each case should not raise the field strength 52 above the saturation field strength 104. At the same time, the period up to connecting the device in the opposite phase 41, i.e. the number of segments 31, is reduced. Conversely, a smaller segment 35 leads to smaller reactive currents 40 as soon as the transformer 2 enters saturation, but the time is prolonged necessary for safely reaching the positive remanence 101 at an unfavorable starting point as to be set in FIG. 1. A possible time period for the time span 30 is, for example, 0.5 second. This would, therefore, result in an order of magnitude of 25 segments 35.

After elapse of the period 30 predetermined by the switching means 12, a cut-in angle smaller than 180 degrees, for example in a range of 150 to 180 degrees, can also be generated by means of the phase cut-in circuit 19 for connection in the opposite phase and for further operation. A complete activation of the opposite phase is unnecessary if the further half waves are likewise smaller than 180 degrees and, with respect to their angular value, are especially smaller than the opposite-phase activation.

Such a device can be utilized, for example, as a dimmer if it is possible to produce with the phase cut-in circuit 19 a larger switch-on angle for connection in the opposite phase 41 and if it is possible to generate, in the phase cut-in circuit 19, at the half waves succeeding the opposite-phase half wave 41, in each case an ignition signal at a predetermined smaller phase cut-in angle.

In other embodiments, the provision can be made that it is possible to produce, in the phase cut-in circuit 19 at the half waves following the opposite-phase half wave, in each case an ignition signal with the setting unit 29 at a predetermined phase cut-in angle not corresponding to 180 degrees, i.e. it is also possible to power a consumer 8 with cut-in half waves. In this connection, in particular, the first opposite-phase segment must be larger than the following operating segments in order to render the hysteresis symmetrical about the zero point.

It is also possible to bridge the thyristor circuit 9 in accordance with a device in German Patent 4,132,208 owned by applicant wherein, after full activation, the thyristor circuit is bridged by a relay in the timing segment 35, in which case the thyristor 9 can be saved for the opposite-phase half wave cut-in.

The operation identifying circuit 10 can comprise a voltage comparison unit by means of which, by voltage comparison, a reduced flawed mains voltage can be detected. If such a flawed and lower mains voltage 5 is detected, the switching means 12 is then reactivated with a delay for a new start of the connection step. By means of such a new start, it is thus safely avoided that the transformer 2 is driven into saturation by the then two successive half waves poled in opposition to the flawed mains voltage half wave.

The principles of the invention can, of course, also be transferred to three-phase current devices. In case the current supply device is a three-phase current supply unit, respectively one alternating-current switch 9 is interposed, for each branch or at least two branches of the three-phase current supply unit, between the mains and the three-phase current supply unit; consequently, the cut-in control circuit 19 supplies, in parallel, one alternating-current switch 9 with the corresponding switching signals, and the other alternating-current switch 9 is activated after a delay period as described, for example, in WO 91/17597 owned by applicant.

I claim:

1. Method for the avoidance of power-up current surge during the starting up of a current supply device under inductive effect connected in series with an alternating-current switch, wherein with a phase cut-in circuit the duration of the connection of the current supply device under inductive effect established with unipolar voltage segments with the mains alternating voltage can be adjusted starting with the instant of activation, characterized by switching on the current supply device under inductive effect with a succession of substantially equal-size unipolar voltage segments wherein, after a predetermined fixed number of switching-on steps, starting up is effected in the subsequent opposite phase with the substantially unipolar segments.

2. Method according to claim 1, characterized in that the unipolar voltage segments exhibit such a predetermined size that, with the given, inductivity-burdened current supply device, in each case a field strength is generated that is smaller or at most equal to a saturation field strength causing the single to five-fold activating current peak value.

3. Method according to claim 1 or claim 2, characterized in that the number of activations is chosen to be so large that, at the segment of a predetermined size, a remanence of the inductivity-burdened current supply device inverted to the poling of the segments can be converted, during switch-on, safely into the magnetization of the same polarity.

4. Method according to claim 1, characterized in that the starting-up is effected independently of an original activation phase position and remanence condition of the inductivity-burdened current supply device.

5. Apparatus for avoidance of power-up current surge upon activation of an inductivity-burdened current supply device comprising an alternating-current switch device connected in series with the inductivity-burdened current supply device, a phase cut-in circuit means for enabling adjustable connection of the inductivity-burdened current supply device with a mains alternating voltage via the alternating-current switch starting with the instant of switch-on, the phase cut-in circuit means generating substantially equal-size unipolar segments for establishing the connection in a plurality of switch-on steps, and a switching means for enabling activation of the inductivity-burdened current supply device after a predetermined number of switching-on steps in the opposite phase with the substantially equal-size unipolar segments.

6. Apparatus according to claim 5, wherein the phase cut-in circuit means and the switching means enable activation of the inductivity-burdened current supply device independently of an original activation phase position and remanence condition of the inductivity-burdened current supply device.

7. Apparatus according to claim 5, wherein the switching means enables activation after a predetermined number of switching-on steps corresponding to a predetermined time, and after the elapse of the predetermined time, the phase cut-in circuit means enables a larger segment angle for connection in the opposite phase, and the phase cut-in circuit means enables generation of an ignition signal at a predetermined smaller phase cut-in angle at half waves following the opposite-phase half wave, respectively.

8. Apparatus according to claim 5 or 7, wherein the switching means is a timing switching member enabling setting of a lead time sufficient for generation of a predetermined number of successions of the substantially equal-size unipolar segments.

9. Apparatus according to claim 5 or 7, further comprising operation identifying circuit means coupled to the switching means for enabling turning on of the switching means with a delay so as to enable with the phase cut-in circuit means production of the substantially equal-size unipolar segments.

10. Apparatus according to claim 9, wherein the operation identifying circuit means enables detection of a reduced flawed mains voltage by a voltage comparison and enables the switching means to be reactivatiable with a delay for a new starting-up of the connection.

11. Apparatus according to claim 5 or 7, wherein the current supply device is a three-phase current supply device and for at least two branches of the three-phase current supply device, respectively one alternating current switch is interposed between the mains and the three-phase current supply device.

12. Apparatus according to claim 11, wherein one alternating current switch is interposed between the mains and the three-phase current supply device for each branch of the three-phase current supply device.

* * * * *